United States Patent
Meade

[15] 3,685,020
[45] Aug. 15, 1972

[54] COMPOUND AND MULTILEVEL MEMORIES

[72] Inventor: Robert M. Meade, Wassaic, N.Y.
[73] Assignee: Cogar Corporation, Wappingers Falls, N.Y.

[22] Filed: May 25, 1970
[21] Appl. No.: 40,086

[52] U.S. Cl. ........................340/172.5, 340/173 AM
[51] Int. Cl. ............................G11c 15/00, G06f 1/00
[58] Field of Search............................340/172.5, 173

[56] References Cited

UNITED STATES PATENTS

| | | | |
|---|---|---|---|
| 3,387,274 | 6/1968 | Davis | 340/172.5 |
| 3,402,399 | 9/1968 | Bragg | 340/172.5 |
| 3,553,659 | 1/1971 | Englund | 340/172.5 X |
| 3,540,002 | 11/1970 | Clapper | 340/172.5 |
| R26,624 | 7/1969 | Bloom et al. | 340/172.5 |
| 3,275,991 | 9/1966 | Schneberger | 340/172.5 |
| 3,387,272 | 6/1968 | Evans et al. | 340/172.5 |
| 3,349,375 | 10/1967 | Seeber et al. | 340/172.5 |
| 3,456,243 | 7/1969 | Cass | 340/172.5 |
| 3,566,358 | 2/1971 | Hasbrouck | 340/172.5 |

*Primary Examiner*—Harvey E. Springborn
*Attorney*—Harry M. Weiss

[57] ABSTRACT

Multilevel memory systems and compound memories. A compound memory includes a random access array with an associative array as part of its accessing means. A match in the associative array between an effective address, identifying an addressed information block, and an associative array word directly energizes corresponding random access array locations which contain the addressed information block. Multilevel memory systems include embodiments such as a compound buffer memory with a backing memory, a compound transformation memory, nested memories with more than two levels, and multilevel control memories.

9 Claims, 9 Drawing Figures

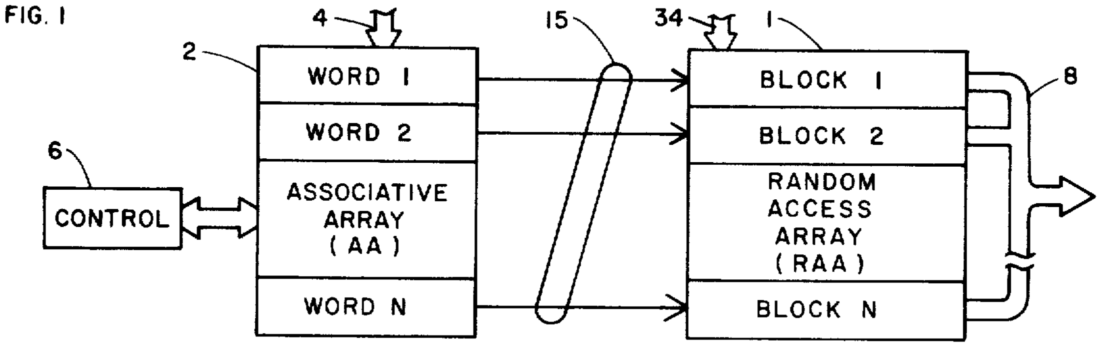
FIG. 3
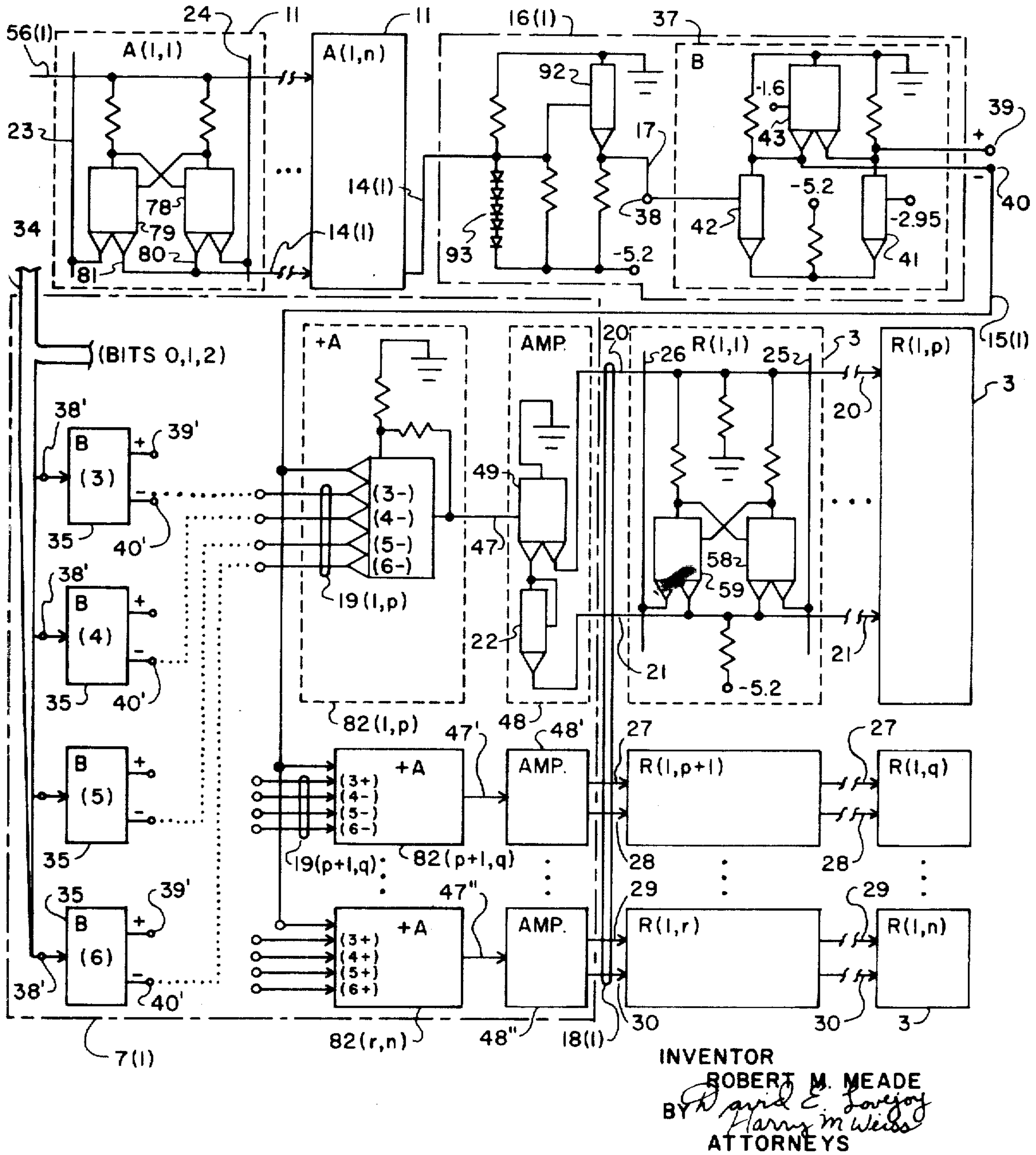
INVENTOR
ROBERT M. MEADE
BY David E. Lovejoy
Harry M. Weiss
ATTORNEYS

COMPOUND AND MULTILEVEL MEMORIES

BACKGROUND OF THE INVENTION

This invention relates to methods and apparatus for computers and particularly to the field of memory system structures for data processing systems. Specifically, this invention relates to compound memories which are composed of random access arrays in combination with content addressable arrays, the latter frequently being called associative arrays.

Associative arrays formed into associative memories have been employed in prior art computing systems for the purpose of relating arbitrary symbolic identifiers of information, herein called "effective addresses", to corresponding physical memory locations. By way of definition, "actual addresses" are addresses employed to identify physical memory locations. Such prior art systems employ the parallel interrogation capability of associative memories by using a system generated effective address to retrieve from the associative memory a unique actual address identifying a physical memory location without going through a time-consuming, repetitive interrogation of each memory location.

Recent data processing systems have been organized with memory hierarchy systems wherein buffer memories, sometimes called cache memories, of relatively low capacity, but of relatively high speed, operate in cooperation with main memories of relatively great capacity but of relatively low speed. Those buffered data processing systems are organized so that the vast majority of accesses of memory storage areas, either to read or to write information, are from the buffer memory so that the overall access time of the system is enhanced. In order to have the vast majority of accesses come from the relatively fast buffer memory, information is exchanged between the main memory and the buffer memory in accordance with a predetermined algorithm implemented with logic circuits.

For the purposes of this specification, the term "information block" or simply "block" defines a movable storage area for a quantity of data variously defined by terms such as pages, segments, or data groups and which are combinations of bits, bytes, digits or words. An information block may be at one physical memory location at one time and at another physical memory location at another time. Information blocks are identified by effective (symbolic) addresses which must be dynamically correlated, at any given time, with actual addresses identifying particular physical memory locations at which the information block is currently located.

In a memory hierarchy system including a random access buffer memory and a random access main memory, it is necessary to determine which information blocks are currently in the buffer memory and which are only in main memory. This determination may be made by maintaining the effective addresses of the information blocks currently residing in the buffer memory in a table. All system generated effective addresses (symbolic identifiers) are compared with all effective addresses in the table in order to obtain the buffer memory actual addresses identifying the buffer memory physical locations containing the sought information block. That comparison is expediously carried out when the table is an associative memory. The associative memory functions (a) to identify and retrieve the actual address of the information block in the buffer that is being symbolically identified by an effective address or (b) to identify that the information block does not currently reside in the buffer.

In prior art apparatus, after locating a match within the associative memory by means of an associative comparison of the system generated effective address with the effective addresses in the associative memory, an actual address corresponding to the matched effective address is read out from the associative memory or is composed by a code generator. That actual address is subsequently transmitted to the address register of the random access buffer memory where it is decoded like any conventional actual address that might be supplied by the processor. After decoding, the accessing circuitry of the random access memory activates the addressed block.

The prior art steps required, therefore, to access random access memory information blocks in a system containing an associative memory for looking up actual addresses are (1) generating an effective address, (2) supplying at least a portion of that effective address to the associative memory, (3) associatively comparing the system-generated effective address with the effective addresses within the associative memory to determine whether or not the addressed information block is in the random access memory and, if an associative comparison (called a match) is found, (4) reading out from an associative memory location corresponding to the match the actual address of the information block within the random access memory, (5) transmitting that actual address from the association memory to the random access memory address register, and (7) accessing the addressed information block in the random access array so as to read or write information out of or into that block.

Other recent data processing system have required the capability of effective-to-actual address transformation to facilitate information relocation. For example, when a system is handling multi-programming operations, physical memory locations are dynamically assigned to each using program depending upon the locations available at the time the using program is entered for execution. Different programs are able, therefore, to use the same physical memory locations at different times. The group of effective addresses generated by the system during the execution of a using program must be converted dynamically to actual addresses in order for the system to correctly access the physical memory locations assigned to the using program. The task, therefore, is to effect a dynamic transformation of each effective address, generated by the system during the execution of the using program, to a corresponding actual address in accordance with the physical memory locations assigned to that program at that time. At any selected time such as when a new using program is entered for execution, information may be relocated by reassigning the correspondence between a set of actual addresses and a set of effective addresses.

A number of prior art systems have been developed to implement the effective-to-actual address transformation task such as required in information relocation systems. Conventional prior art implementations employ a non-associative direct conversion of effective addresses to actual addresses. In so doing, an effective address is supplied to a randomly accessed relocation memory to access a physical memory location containing a corresponding actual address which specifies a physical location in a randomly accessed main memory. The actual address read out from the relocation memory is transmitted to the main memory address register, then is decoded, and finally is driven into the main memory array so as to access the physical memory location containing the information block originally addressed.

The prior art steps, therefore, required for effective-to-actual address transformation with a data processing system having randomly accessed main and relocation memories include (1) generating the effective address from the using program, (2) supplying at least a portion of that effective address to the memory address register of the randomly accessed relocation memory, (3) decoding the effective address, (4) accessing a location in the relocation memory to read out a main memory actual address, (5) transmitting that actual address to the main memory address register, (6) decoding that actual address, and (7) accessing the addressed location so as to read or write information out of or into that location.

More recently, because data processing systems have been employed for servicing many users simultaneously, programs have been allowed to address more information blocks than can be simultaneously assigned to physical memory locations. The programs identify the addressed information block using an effective (symbolic) address and the task is to dynamically convert the effective address to an actual address. Use of the direct-conversion-table-lookup method of deriving the actual address corresponding to the program's effective address requires a very large and therefore, expensive conversion memory. Prior art systems have, therefore, in some cases, used an associative memory to look up actual addresses corresponding to effective addresses.

The use of an associative memory to convert effective addresses to actual addresses in the address transformation systems is fully analogous to effective-to-actual address conversion in the above-mentioned buffer data processing systems.

Although the effective-to-actual address conversions in buffer and transformation systems are analogous, those two conversions do not collapse into a single level of effective-to-actual address conversion because the assignment of physical memory locations in buffer memories is dynamic within program execution in both types of systems.

While there are, of course, other combinations of memories within data processing systems, the combinations described are typical examples. In those examples, the speed of the data processing system is a function of the speed with which addressed information can be accessed which, in turn, is a function of the interaction between the several memories, as indicated by the numbered steps listed above. Prior art interactions of memories, some of which may be associative memories, have all included unnecessarily redundant functions which lower the speed of system operation and increase system cost.

Furthermore, prior art systems including associative memories and random access memories, particularly where the latter are of large capacity, have been independently controlled and physically separate. Additionally, past memory technologies have not permitted efficient combinations of random access and associative arrays.

SUMMARY OF INVENTION

In view of the above background of the invention, the present invention is for a compound memory system in which a random access array includes an associative array as part of its accessing means. The accessing of an information block within the random access array portion of the compound memory is made by a direct energization of the random access array locations containing the addressed information block. That direct energization is caused by a match in the associative array portion of the compound memory between an effective address identifying the addressed information block and an associative word in associative array locations which have a direct correspondence to the random access array locations which contain the addressed information block.

In accordance with one aspect of the present invention, the random access array and the associative array portions of the compound memory have, in one implementation, common control and are physically united in a single monolithic package so as to provide an efficient memory structure. In that memory structure, the random access array cells and the associative array cells are directly coupled and fully compatible.

In one embodiment of the present invention, a data processing system includes a buffer memory for storing a limited number of information blocks and a main memory for storing a relatively large number of information blocks. The buffer memory is a compound memory in that its accessing means includes an associative array directly linked to a random access array. The associative array portion of the buffer memory stores associative words which correspond to at least a portion of the effective addresses of information blocks that are currently contained within the random access array portion of the buffer memory. When the data processing system generates an effective address, at least a portion of that effective address is gated to the associative array which makes a parallel comparison of all associative words and, if a correspondence is found, directly energizes locations in the random access array thereby accessing the addressed information block. If a correspondence is not found, the addressed information block is accessed in the main memory.

In accordance with another embodiment of the present invention, information relocation within a data processing system is carried out with a main memory which is a compound memory. During operation, the associative array portion of the compound main memory stores words corresponding to at least a portion of the effective addresses assigned to the information blocks within the random access array portion of the compound main memory. When an effective address is generated in the data processing system, at least a portion of the effective address is supplied to the associative array which directly accesses an information block in the random access array for which correspondence is found.

The above embodiments of the present invention require only the following steps in order to access an information block from within a data processing system: (1) generating the system's effective address, (2) supplying the effective address to the associative array of the compound memory, (3) associatively comparing at least a portion of the effective address thereby directly accessing an information block within the random access array of the compound memory if a correspondence is found in the associative array.

In accordance with another aspect of the present invention, a data processing system includes a first compound memory (e.g., compound buffer memory) and a second compound memory (e.g., compound main memory). The first compound memory includes a first associative array as an accessing means for its random access array. In a similar manner, the second compound memory includes a second associative array as part of its accessing means for its random access array. Together the first and second compound memories provide a memory structure which efficiently implements the above described buffer and relocation functions. Means are provided for gating at least a portion of the system's effective address first to the first compound memory in order to directly access an information block therewithin if a match occurs in the first associative array. If no match occurs in the first associative array, means are provided for supplying at least a portion of the system's effective address to the second compound memory to thereby directly access an information block within the second compound memory. The information block accessed from the second compound memory is the one addressed by the system's effective address which was not found within the first compound memory.

Additionally, in the data processing system including first and second compound memories, means are also provided (1) for transmitting the effective address of an information block accessed from the second compound memory to an associative word location in the associative array portion of the first compound memory and (2) for transmitting the information block accessed from the second compound memory to random access array locations of the first compound memory which correspond to the associative word location to which the information block's effective address is transmitted. With these transmssions, the first compound memory is always updated with the most recently accessed information block.

Still additionally, in the system with first and second compound memories, means are provided for transmitting effective addresses to associative word locations in the association array portion of the second compound memory so as to identify the information blocks currently occupying the physical memory locations of the random access array portions of the second compound memory.

In accordance with another aspect of the present invention, N levels of compound memories are nested together. The effective address attempts to access an addressed information block within a first compound memory. If the effective address is not operative to access an information block from that first compound memory, the effective address attempts to access the addressed information block from a second compound memory. Similarly, if the second compound memory does not contain the addressed information block the effective address attempts to access third and subsequent compound memories until the addressed information block is accessed. In a manner previously described, any low order compound memory which fails to access the addressed information block may be up-dated with the addressed information block when it is subsequently accessed in a higher order compound memory. Any conventional replacement algorithm may be employed in up-dating the lower order compound memories.

The present invention also includes memory hierarchies within a system having a control memory section and a data memory section wherein at least the control memory section is multileveled and may include nested compound memories.

Another feature of the present invention includes a memory hierarchy including three or more levels of memory wherein the information block size for transfers between the second and third levels is from two to eight times the block size for transfers between the first and second levels and wherein any one or more of the memories may be a compound memory.

DESCRIPTION OF THE DRAWINGS

FIG. 1 depicts a block diagram of a basic compound memory including an associative array directly coupled to a random access array.

FIG. 3 depicts a schematic diagram of an associative array word, including a typical associative cell in detail, directly coupled to a random access array block, including a typical random access cell in detail.

DETAILED DESCRIPTION

Figure 2:
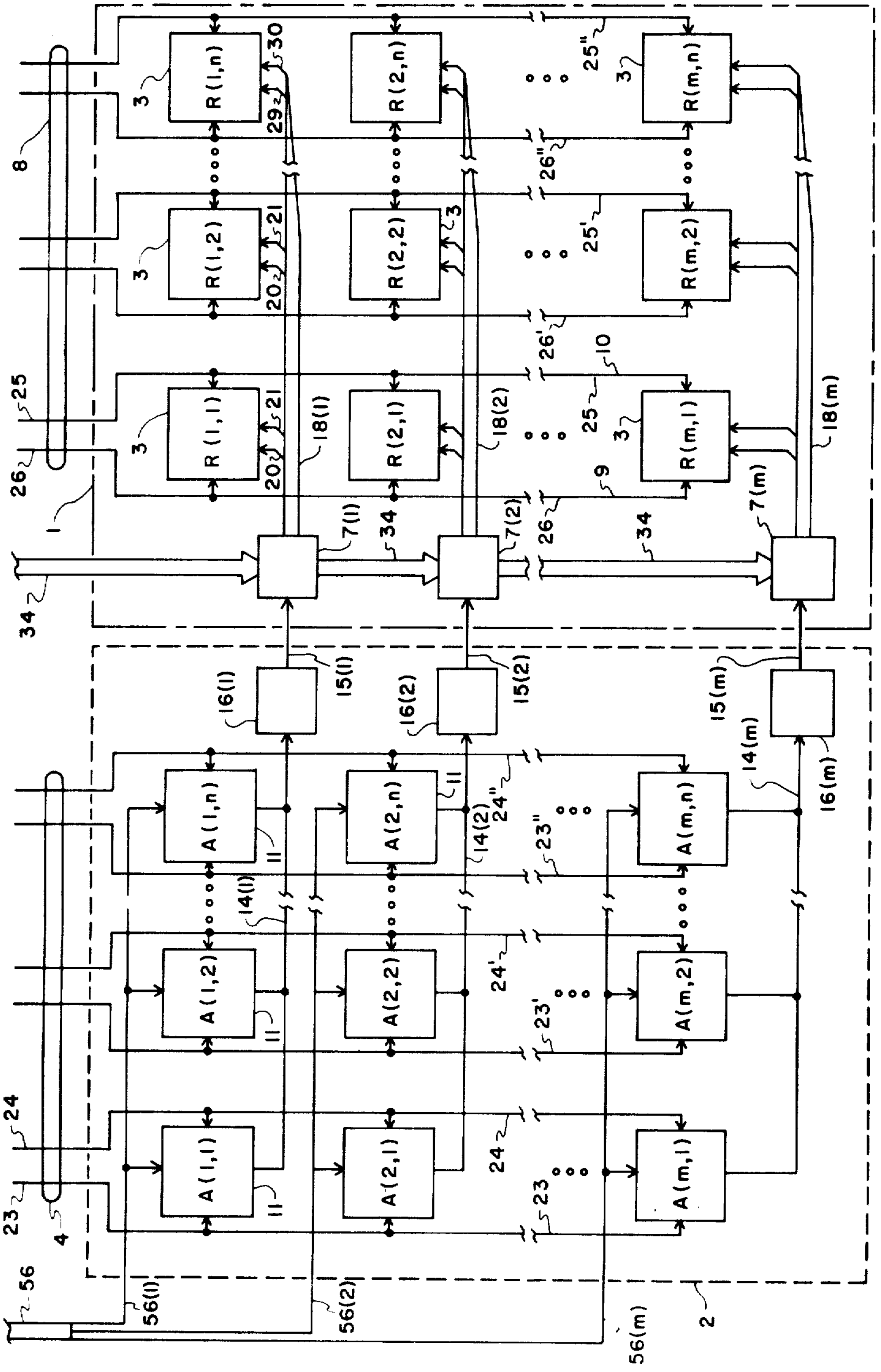
FIG. 2 depicts further details of a compound memory of the FIG. 1 type showing directly coupled associative array and random access array structures.

In FIG. 1 a compound memory in accordance with the present invention is comprised of a random access array 1 directly connected to an associative array 2. U.S. Pat. No. 3,387,274 to Davis describes an associative array. Although the random access array and the associative array may be implemented in many technologies such as cryogenics or magnetic cores, they are preferably implemented in monolithic semiconductor technology as described in U.S. Pat. No. 3,508,209 to Agusta et al.

The random access array is organized into N physical memory locations which are effective to store N information blocks. An "information block" or simply "- block" is defined, for the purposes of this specification, as a movable storage area for a quantity of data and which has been defined by terms such as pages, segments, or data groups which are in turn, combinations of bits, bytes, digits or words. Random access array 1 includes information blocks BLOCK 1 . . . BLOCK N.

Directly connected to the physical memory locations of random access array 1, as their accessing means, are the associative array word locations of associative array 2 which contain associative words WORD 1 . . . WORD N. Associative WORD 1 is, for example, operative to access BLOCK 1. In operation, a portion of an effective address (symbolic identifier)generated by the information processing system is applied over input lines 4 to the monolithic semiconductor associative array 2. If a match is found between one of the associative words and the effective address on lines 4, the corresponding block select line of the block select lines 15 is energized to access the directly connected information block in monolithic semiconductor random access array 1. The accessing of the information block causes data to be read into or to be read out from the block accessed. The various control signals required for the indicated operations are derived from a control 6. In order to select specific parts (less than a complete block) in the random access array 1, the low order portions of the effective address can be employed in a manner to be described further hereinafter.

FIG. 2 depicts in detail, a compound memory similar to that of FIG. 1. In FIG. 2, random access array 1 includes a plurality of monolithic semiconductor binary storage elements 3. The binary storage elements 3 are organized in an array including rows R(1,1) through R(1,*n*), R(2,1) through R(2,*n*), and R(*m*,1) through R(*m*,*n*). While a typical element R(*i*,*j*) of the indicated elements is a single binary storage element, each may also be representative of a plurality of binary elements representing a plurality of binary bits.

Each of the rows of binary storage elements 3 may be accessed by a respective accessing means 7(1), 7(2) . . . 7(*m*). Since the storage elements 3 are, in accordance with a preferred embodiment of the present invention, comprised of monolithic semiconductor elements the several accessing means 7(-) typically include, among other things, driving circuits suitable for energizing monolithic arrays.

The output from each of the accessing means 7(-), is connected to corresponding row conductors 18(-), of the row conductors 18(1), 18(2) . . . 18(*m*), which energize the binary storage elements 3 in the respective connected rows. Each of the accessing means 7(-) for driving a corresponding row of binary elements 3, is directly energized by an input from a corresponding one of the lines 15(-) from the associative array 2. Additionally, each accessing means 7(-) can accept inputs from the low order bits of an effective address, via bus 34, as described in further detail hereinafter.

In FIG. 2, read/write lines 8, including "0" column line 26 and "1" column line 25, are provided for writing in and reading out information from random access array 1. When a signal on the block select line 15(1), for example, energizes accessing means 7(1), the row (or portion thereof determined by low order inputs from bus 34) of storage elements R(1,1) through R(1,*n*) are accessed. That accessing, in the case of reading, causes the "1" or "0" contents of each element 3 to be transmitted to the corresponding one of the lines 8. Similarly, energization of the accessing means 7(2) by block select line 15(2) renders on the appropriate one of the lines 8 an indication of the "1" or "0" condition of each of the binary storage elements 3 in the row R(2,1) through R(2,*n*) (or a portion thereof).

In the case of an access for writing information into random access array 1, respective "1" or "0" input signals are applied to each of the lines 8 so that all of the storage elements 3 in array 1 receive those input signals. Energization of a select one of the accessing means 7(-) simultaneously with the energization of those lines 8 causes a corresponding row of elements 3 (or a position thereof) to store the input information.

In accordance with the present invention, each accessing means 7(-) in random access array 1 is energized directly by one of the block select lines 15(-) from associative array 2. Associative array 2 is comprised of a plurality of binary storage elements 11. Storage elements 11 are most advantageously monolithic semiconductor associative memory cells which, besides being capable of being accessed for purposes of writing (or reading), are capable of performing a comparison in each cell. The comparison of the contents of the cell is with an input signal such as may be applied to the column lines 23 and 24 of lines 4.

Storage elements 11 are organized into an array comprised of a plurality of rows A(1,1) through A(1,*n*), A(2,1) through A(2,*n*) and A(*m*,1) through A(*m*,*n*). Each storage element 11 in each row is connected to a corresponding match identifier line 14(-). Each of the match identifier lines is connected, by a corresponding connecting means 16(-), to a corresponding accessing means 7(-) for a row within random access array 1. Each of the connecting means 16(-) may be no more than a conductor or may include storage elements such as triggers, selectively operable elements such as gates, or electrical matching circuits such as phase-splitting buffers. The function of each connecting means 16(-) is to energize the connected accessing means 7(-) directly upon the energization of a corresponding one of the match identifier lines 14(-).

In associative array 2, column lines 23 are employed for detecting whether or not the connected storage elements 11 are storing a "0". Similarly, column lines 24 are employed to determine if any of the connected storage elements 11 contain a "1". In conventional operation, only one or the other of the lines 23 and 24 for any one column of storage elements 11 is energized at any one time. While two lines 23 and 24 have been described, array elements requiring only one line may be employed. Conventional operation additionally usually employs match identifier lines 14(-) as "mismatch" lines.

If any of the storage elements 11 in any given row do not contain a "0" in the case of energization of column lines 23, or a "1" in the case of energization of column lines 24, then a mismatch signal is generated by the storage elements onto match identifier line 14(-). Accordingly, if any one of the storage elements 11 in a row does not contain a "1" or a "0" corresponding to the input applied via lines 4, a mismatch signal is generated on match identifier line 14(-). That mismatch signal can then be inverted, for example, in connecting means 16(-) to render directly a match indication to the connected accessing means 7 (-) in random access array 1.

FIG. 3 depicts a typical associative word, A(1,1) to A(1,n) of associative array elements 11 directly connected to a block, R(1,1) to R(1,n), of random access array elements 3. The elements 11 are monolithic semiconductor bistable storage cells. Specifically, elements 11 are comprised of multiemitter transistors 78 and 79 shown in detail for element A(1,1). The element A(1,1) is effective to render a signal on match identifier line 14(1) when transistor 79 renders an output on line 81. An output occurs on line 81 if transistor 79 stores a "1" when the bit "0" line 23 is energized. That is, if the input on line 23 is a "0" and transistor 79 contains a "1", a no-match signal is indicated on match identifier line 14(1). In a similar manner, if line 24 is energized, a no-match signal is indicated on match identifier line 14(1) via output line 80 if transistor 78 stores a "0". If transistors 78 and 79 store a "0" and a "1", respectively, then energization of either line 23 or 24 does not cause any output on line 14(1).

When it is desired to store the "1" or "0" signals applied on lines 23 and 24 of FIG. 3, such as when storing an effective address in a WORD location of associative array 2 of FIG. 2, line 56(1) of the word select lines 56 is energized. Energization of line 56(1) when line 23 is "0" and line 24 is "1" stores "0" and "1" in transistors 79 and 78, respectively. Similarly, energization of line 56(1) when line 23 is "1" and line 24 is "0" stores "1" and "0" in transistors 79 and 78, respectively.

In FIG. 3, connecting means 16(1) is connected to the match identifier line 14(1) where line 14(1) is connected to each of the binary storage elements 11 within word A(1,1), A(1,2) . . . A(1,n). Connecting means 16(1) includes a conventional monolithic semiconductor amplifying and impedance matching circuit, including switching device 92 and biasing element 93, for detecting any mismatch signal on line 14(1) and coupling it onto line 17. Line 14(1) conducts as the result of a mismatch and thus a mismatch renders line 17 positive and a match renders line 17 negative. In addition to the impedance matching and coupling circuit, connecting means 16(1) includes a phase-splitting buffer circuit 37. Buffer circuit 37 includes an input terminal 38 connected to line 17 and "+" and "−" output terminals 39 and 40, respectively. When line 17 (and terminal 38) is negative indicating a match (no mismatch), the signal at 40 is inverted while the signal at 39 is not. Buffer 37 includes two complementary switching transistors 41 and 42 and a double-emitter transistor 43.

The output from the connecting means 16(1) is the block select line 15(1) derived from output terminal 40. In FIGS. 1 and 2, there is one block select line 15(-) analogous to line 15(1) for each associative word in associative array 2 and for each information block in random access array 1.

The block select line 15(1) from the connecting means 16(1) is connected to an accessing means 7(1). The accessing means 7(1) directly connects the block select line 15(1) to the row conductors 18(1) which connect to the binary storage elements 3. The elements 3 in FIG. 3 are typical of the elements 3 of FIGS. 1 and 2 and represent information block R(1,1), R(1,2) . . . R(1,n).

The accessing means 7(1) may include conventional monolithic 5-input AND gates 82(-), which, besides the block select line 15(1), include as inputs the low order select lines 19(-) where the latter are typically derived from the low order bus 34 through phase-splitting buffers 35. Each of the buffers 35 is identical to the buffer 37 and includes input 38′ and "+" and "−" outputs 39′ and 40′, respectively. The inputs 38′, of the four buffers 35 labeled B(3), B(4), B(5) and B(6), are connected, respectively, to the address bits 3, 4, 5 and 6 from low order bus 34. Note that bits 0, 1 and 2 from that bus 34, in the particular example chosen, are not employed.

AND gate 82(1,p) is typical and is shown to include a five-emitter transistor receiving as inputs line 15(1) and the buffer lines 3-, 4-, 5- and 6-. AND gate 82(1,p) is operative, therefore, to energize its output line 47 when address bits 3, 4, 5 and 6 are all "0". Similarly, AND gate 82(p+1,q) energizes its output line 47′ when address bit 3 is "1" and address bits 4, 5 and 6 are all "0" and AND 82(r,n) energizes its output line 47″ when the address bits 3, 4, 5 and 6 are all "1".

Line 47 output from AND 82(1,p) is connected as an input to amplifier 48 which is shown in detail as typical. Amplifier 48 includes a double-emitter transistor 49 having one emitter connected to low order row line 20 (of the row lines 18(1)) and having the other emitter connected through transistor 22 to low order row line 21 (of the row lines 18(1)). The lower order row lines 20 and 21 are directly connected to each of the random access array cells 3 of the cells R(1,1) to R(1,p). Analogously low order row lines 27 and 28 connect to cells R(1,p+1) to R(1,q) and lines 29 and 30 to R(1,r) to R(1,n).

For a typical example chosen, the random access array 1 of FIG. 2 has 1,024 data bits in the block R(1,1) to R(1,n), that is "n" equals 1,024 data. Further, that information block, now referring to FIG. 3, is divided into 16 words R(1,1) to R(1,p), R(1,p+1) to R(1,q) . . . R(1,r) to R(1,n). Letting each word equal eight eight-bit bytes, "p" equals 64, "q" equals 128 and "r" equals 960.

The random access array cells 3 are, in a preferred embodiment, monolithic semiconductors similar to the associative array cells 11. Cell R(1,1) is shown in detail in FIG. 3 as typical. Cell R(1,1) includes bistable multiemitter transistors 58 and 59. One emitter of transistors 58 is connected to the "1" line 25 (of the read/write lines 8) and the other emitter is connected to the low order row line 21. Similarly, one emitter of transistor 59 is connected to the "0" line 26 (of the read/write lines 8) and the other to the low order row line 21.

Accessing of cell R(1,1) for reading occurs by energizing low order row lines 20 and 21 causing a signal to appear on line 25 if a "0" is stored in transistor 58 and a "1" is stored in transistor 59 or causing a signal to appear on line 26 if a "1" is stored in transistor 58 and a "0" is stored in transistor 59.

Accessing of cell R(1,1) for writing occurs by energizing lines 20 and 21 while simultaneously energizing line 26 to write a "0" or line 25 to write a "1".

While the accessing means 7(1), shown as typical for the accessing means 7(-) in FIG. 2, includes low order decode lines 19(1,p) shown as typical for the decode lines 19(-), the low order decode lines are optional in that the accessing of an information block within the random access array 1 of FIG. 2 may be solely under the control of the associative array 2. Such a configuration is implemented, for example, by connecting block select line 15(1) directly to line 47 which is an input to amplifier 48.

In accordance with the above description, a compound memory has been described which includes a random access array directly connected to associative array means for accessing a block in the random access array. The associative array is characterized as directly connected to the random access array from one or more of the following reasons. A match signal from the associative array does not require the accessing and subsequent decoding of a random access array actual address but rather energizes the physical memory locations in the random access array itself. Further, no intervening timing cycle is required after a match in the associative array and before accessing in the random access array. Still further, when the random access array cells and the associative array cells are implemented in the same technology, the appropriate cells may be interconnected within the same monolithic package.

Compound Memory Buffer System

Figure 4:
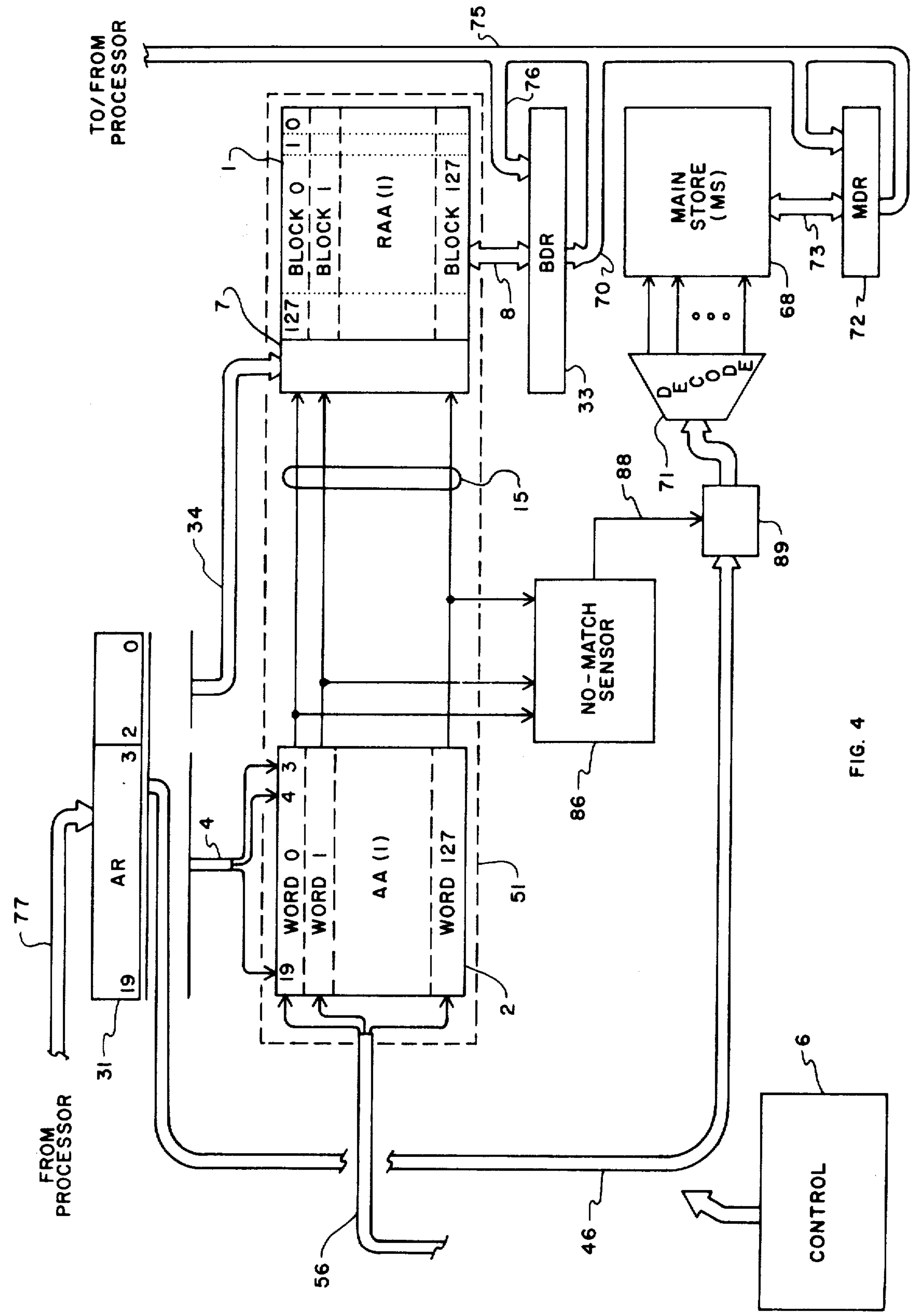
FIG. 4 depicts a block diagram of a compound memory like that of FIG. 1 organized into a buffer system which includes a conventional main store as a backing memory.

In FIG. 4, compound memory 51 is comprised of the associative array 2 and random access array 1 of the type depicted in FIG. 1. The compound memory 51 has read/write lines 8 from the random access array 1 connected to a buffer data register (BDR) 33 which is in turn connected via its out bus 70 to the system bus 75. The input to the associative array 2 of compound memory 51, over input lines 4, is from an address register(AR) 31 which receives an input from system address bus 77.

When the buffered data processing system addresses with a set of effective (word) address bits, for example 0 through 19, derived from a processor (not shown), the high order bits 19 through 3 are conveyed via lines 4 to associative array 2. The low order bits 2 through 0 are conveyed via bus 34 to random access array 1 for low order decoding. The particular information block selected is determined by energization of one of the block select lines 15 which occurs when the high order effective address bits compare with an entry in associative array 2. One of eight words, as determined by bits 2 through 0, is thereby accessed from the selected block in the random access array 1.

When the random access array 1 is being accessed for read out, the particular portion of the accessed information block specified is directly read out into the buffer data register 33 via sense lines 8. If the random access array 1 is being accessed for storage, then the information block is stored in the accessed location over lines 8 from register 33. The data width of the bus 8, the buffer data register 33 and the input bus 76 are of course selectable by designers choice considering the low order decoding and the number of bits set aside therefore. The system of FIG. 4 shows, for example, random access array 1 including 128 blocks of eight words of 16 bytes each so that each block contains 128 bytes numbered 0 – 127. Hence, the width of bus 8, buffer data register 33, and input bus 76 is one word of 16 bytes (which totals 128 bits).

In addition to the compound memory 51, the compound memory buffer data system of FIG. 4 includes a conventional main store 68 having a conventional output memory data register 72 and conventional address decoder 71 which is typically connected to address register 31 by bus 46. Conventional main store 68 may, of course, include one or more additional address registers.

Additionally, the system of FIG. 4 includes a no-match sensor 86 for detecting when, after an effective address has been applied to the associative array 2, no signal occurs on any of the match identifier lines 15. No-match sensor 86 is typically a conventional OR circuit optionally combined with an AND, or other gas circuit, having an appropriate timing input from control 6. No-match sensor 86 indicates at a specified time that no signal has occurred on any of the lines 15. With no signal on lines 15, the no-match sensor 86 is operative to open a gate 89 via control line 88 thereby allowing the effective address from address register 31 to be transmitted to the main store decoder 71. While in FIG. 4 the control line 88 is shown connected to gate 89, the control line 88 may, in a conventional manner, connect directly to decoder 71 thus eliminating the need for gate 89. As a further alternative, the control line 88 from the no-match sensor 86 may connect as a gating control to the memory data register 72 or the address register 31. The system of FIG. 4 additionally includes input lines 56 to the associative array 2 for use when it is desired to write into any of the WORD locations of associative array 2. The writing into associative array 2, as well as other similar functions in the system of FIG. 4, are under control of a conventional control 6.

Operation of Compound Buffer Memory System

Figure 5:
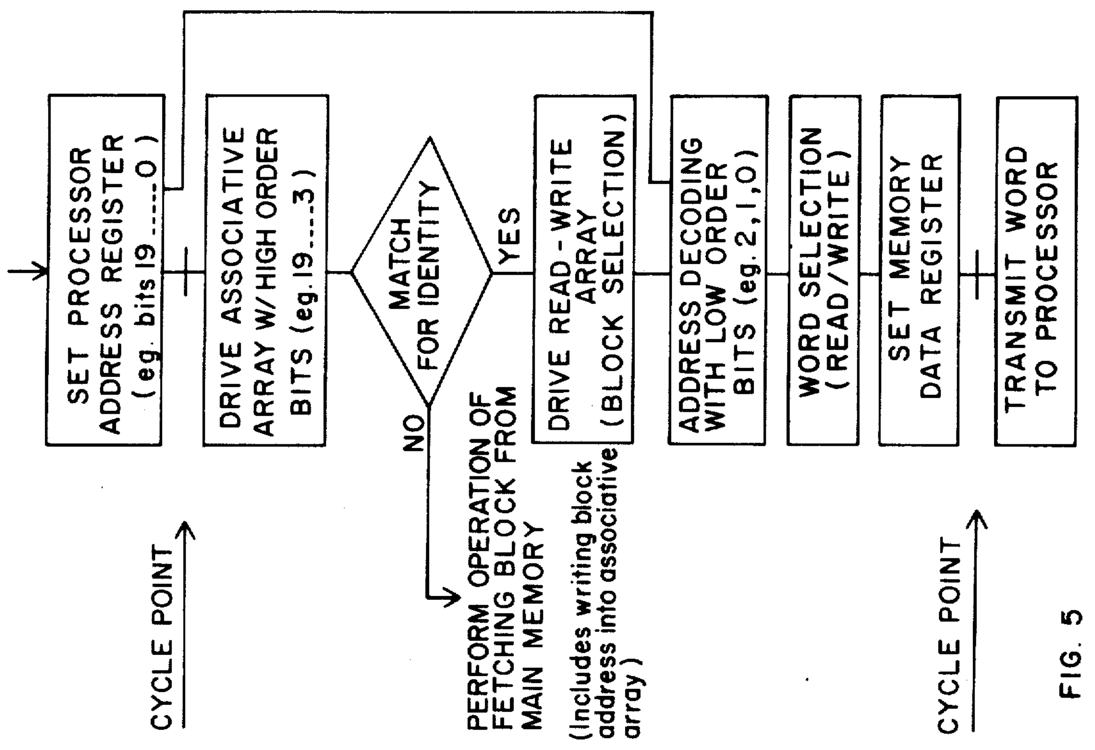
FIG. 5 depicts a flow chart of the logical sequencing and timing of the buffer system of FIG. 4.

FIG. 5 depicts, as a flow chart, the operation of the system of FIG. 4. As indicated in FIG. 5, the first step is for the processor, via bus 77, to set into address register 31 of FIG. 4 the effective address (e.g., bits 19 through 0) of an information block to be accessed. The setting of address register 31 occurs at or before a first one of sequential cycle points. Thereafter in the next step, the high order address bits 19 through 3 are driven into the associative array 2 to determine if they match one of the associative words, word 0 through word 127 therein. If a match does occur, the next step is to drive the read/write circuitry of the random access array 1 by energization of a corresponding one of the block selection lines 15.

The energization of a block selection line is accompanied by a decode of low order bits 2 through 0 in order to select a desired portion, such as a word, of the addressed information block. The selection, if for reading, causes the information block or portion thereof to be set into the buffer data register 33 where it is latched during or before the next cycle point. Thereafter, in the next or a subsequent cycle, the portion of an information block in the buffer data register 33 is transmitted via bus 70 and system bus 75 to the processor or other points within the system.

If the accessing is to write information into random access array 1, the word selection step indicated in FIG. 5 is a word/write step and the appropriate information to be stored is conveyed to the random access array typically from buffer data register 33, the latter being loaded via the bus 76 in FIG. 4. Bus 76 typically connects as an input to buffer data register 33 from bus 75, but alternatively is connected directly to the read/write lines 8 of random access array 1 in FIG. 4.

Transformation Memory

Figure 6:
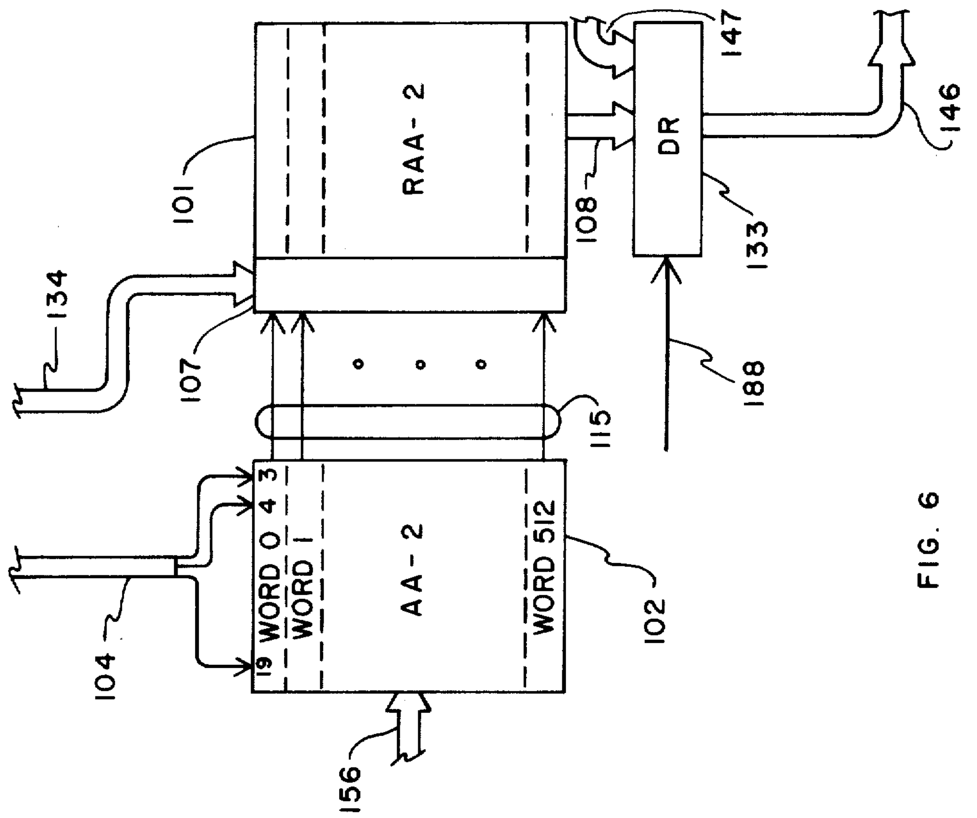
FIG. 6 depicts a compound memory which is used as a transformation memory for program relocation.

FIG. 6 depicts a transformation compound memory comprising associative array 102 and random access array 101. Random access array 101 has, in one embodiment, an output data register 133 which supplies on bus 146 an actual address transformed from the effective address on bus 104. Bus 104 serves as input to the associative array 102 and is typically derived from the address register 31 of FIG. 4 where bus 4 is connected to bus 104. In this embodiment, the low order address bus and corresponding subselection within row (-) of array 101 typically is not employed. Additionally, the data register 133 has a control input 188 which can typically be derived from the no-match sensor 86 of FIG. 4.

When the FIG. 6 compound memory is employed in conjunction with the FIG. 4 system, the transformed address in data register 133 is supplied to the main store decoder 71 of FIG. 4 whenever a control signal on line 88 indicates that a no-match condition is detected in associative array 2. Thereafter in FIG. 6, the signal on line 188 (connected to 88) causes the transformed address in data register 133 to be decoded in decoder 71 (via bus 146 connected to gate 89) so as to access the addressed information block from the main store 68. Thereafter the accessed information block is written into the random access array 1 and the effective address in address register 31 is written into the corresponding word location in associative array 2.

While the transformation memory of FIG. 6 has been described in combination with the buffer compound memory system of FIG. 4, the transformation compound memory of FIG. 6 can be employed alone such as in the system of FIG. 4 when the buffer compound memory 5 is eliminated therefrom. When the transformation memory of FIG. 6 is employed alone, then of course, the control input 188 is not derived from the no-match sensor 86 but is derived from an independent source such as control 6.

Alternatively, the compound memory of FIG. 6 can be employed alone as the main memory 68 of FIG. 4. In this configuration the compound memory performs the address transformation (program relocation) function while being itself the system main memory. Buses 104 and 134 of FIG. 6 serve as inputs to the associative array 102 and the random access array 101, respectively, and are typically derived from the address register 31 of FIG. 4 where bus 4 and bus 34 are connected to bus 104 and bus 134, respectively. Data register 133 is connected to the systems data bus 75 via input bus 147 and output bus 146, replacing memory data register 72 and its bus 73 of FIG. 4. In this embodiment the buffer compound memory 51 of FIG. 4 does not exist and control line 188 is activated by system control 6.

It should be apparent that a plurality of compound memories as have been described may be operated in parallel in order to extend total memory capacity to any required number of words.

Nested Compound Memories

Figure 7:
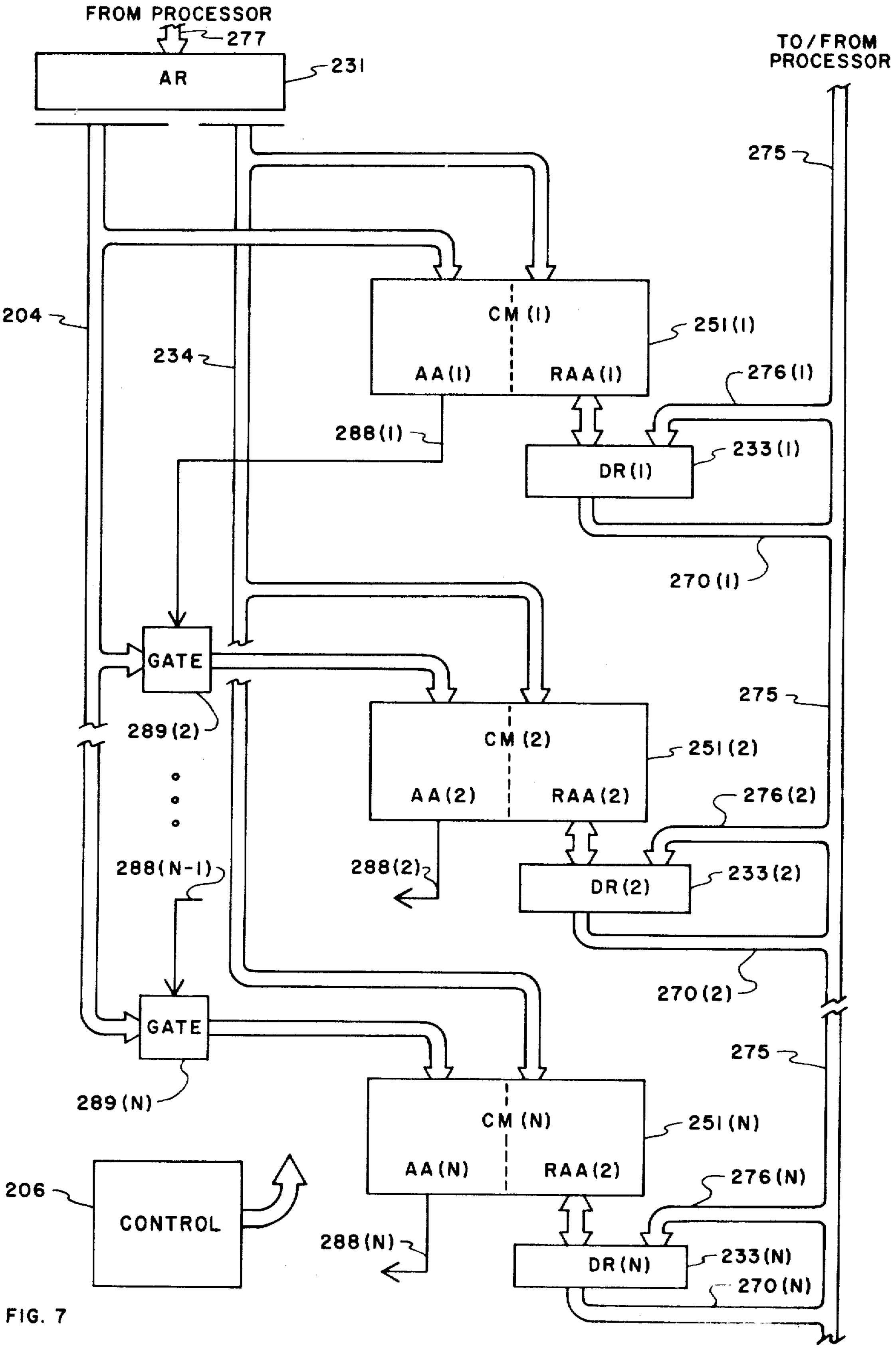
FIG. 7 depicts an N-level nested configuration of compound memories.

FIG. 7 depicts a plurality of compound memories 251(1), 251(2) . . . 251(*n*) forming a nested configuration of N compound memories. Each of the compound memories has supplied to its associative array portion AA, the high order bits of an effective address via high order address bus 204. Similarly, each of the random access array portions, RAA, of the compound memories 251(-) are fed with low order address bits via low order address bus 234. Address buses 204 and 234 are derived from address register 231 which is analogous to the address register 31 of FIG. 4.

In FIG. 7, each of the random access array portions RAA(-) of the compound memories of FIG. 7 includes an output data register 233(-). Specifically, compound memory 251(2) includes output data register 233(2), and compound memory 251(N) includes output data register 233(N). Each of the data registers 233(-) is connected by an output bus 270(-) to the system bus 275. In addition to the out-buses, the random access arrays RAA(-) include input buses 276(-) which typically feed data registers 233(-). Each of the associative array portions AA(-) of the compound memories includes a no-match control line 288(-). Each of the compound memories of FIG. 7 is analogous to the compound memories previously described in connection with FIGS. 1, 2 and 4. Similarly, the operations of the compound memories of FIG. 7 typically include the buffer function as previously described in connection with FIGS. 4 and 5 and subsume the transformation function previously described in connection with FIG. 6.

Operation of Nested Compound Memory System

Figure 8:
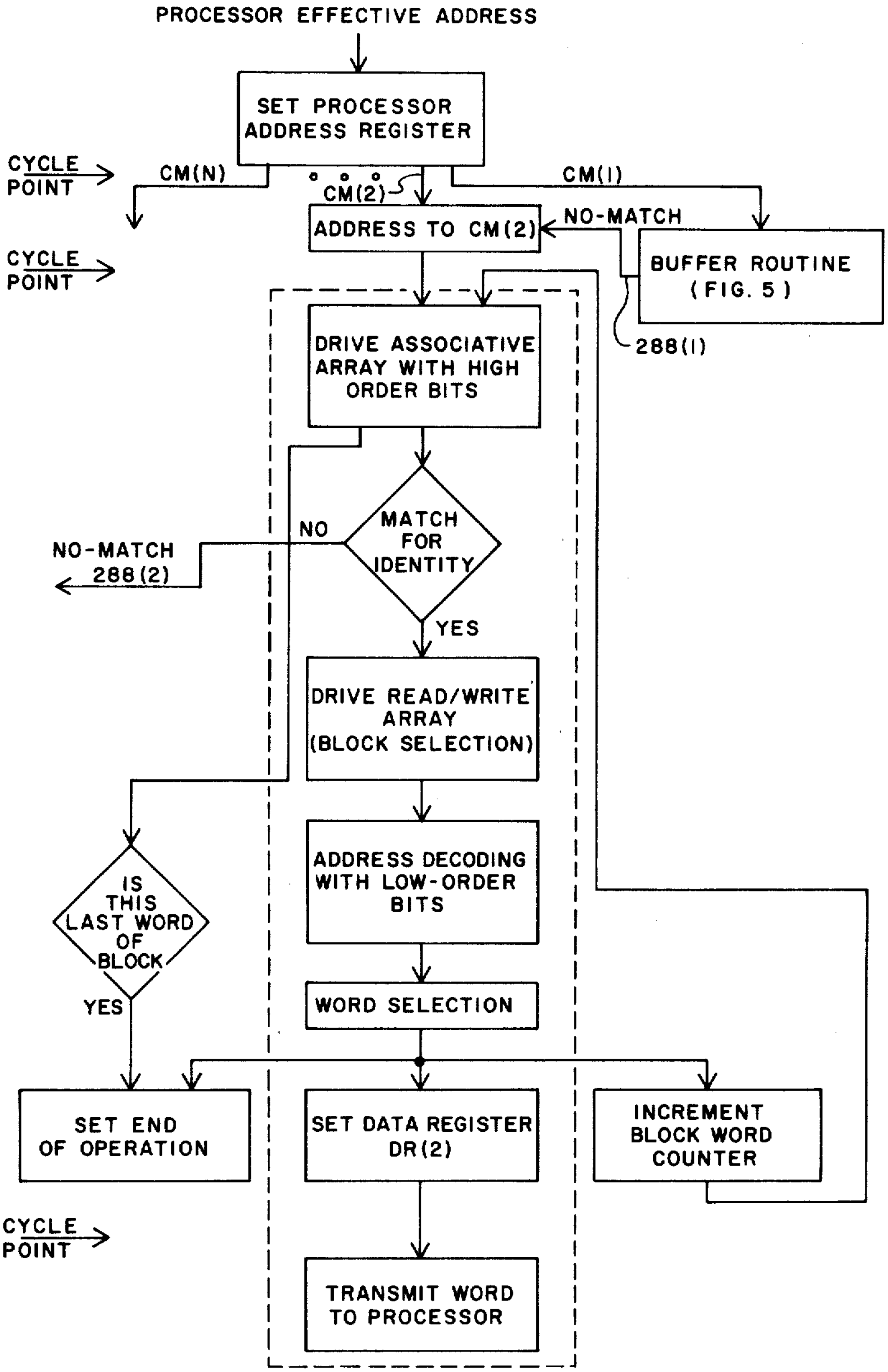
FIG. 8 depicts a logical flow and timing diagram for the nested compound memory system of FIG. 7.

The operation of the nested compound memory system of FIG. 7 is conveniently described using the logic flow and timing diagram of FIG. 8. In FIG. 8, the first step is to set the address register 231 with the effective address via system bus 277 as is typically generated by the processor (not shown). The effective address is in the address register at or before the first cycle point. In the next cycle it is transmitted to the association array portion AA(1) of the lowest order compound memory 251(1).

Compound memory 251(1) completes a buffer routine identical to that previously described in connection with the flow chart of FIG. 5. Simultaneously with being transmitted to the compound memory 201, the effective address is also held available on buses 204 and 234 for each of the higher order compound memories 251(2) . . . 251(N). The higher order compound memories are not enabled, however, unless a control signal is developed on line 288(1) during the buffer routine. If a control signal appears, line 288(1) energizes gate 289(2) allowing the higher order effective address bits to be driven into the associative array portion AA2 of compound memory 251(2).

If no match for identity is found in compound memory 251(2), then control line 288(2) is energized to enable the next higher order compound memory. If a match is found in compound memory 251(2), the random access array portion RAA(2) is driven by the energization of a block selection line which coupled with the low order bits supplied via bus 234 causes the word selection. The word selection can be for either reading or writing as previously described. If the selection is reading, the accessed word is set into data register DR(2). With the information set in DR(2) at or before the next cycle point, the information may be transmitted during the following cycle via bus 270(2) and system bus 275 to the processor or other points in the system. For example when the addressed information block is not found in the compound memory 251(1), the accessed information block in compound memory 251(2) is read into compound memory 251(1) via bus 276(1) while also being transmitted to the processor via bus 275.

While the accessing of one information block or one word or cycle within an information block may be all that is desired from the nested compound memory configuration of FIG. 7, it is frequently desirable after reading out or writing in one word during the word selection step to increment by one and access the next word or byte in an information block. A record of which word or byte out of the series to be accessed is recorded in conventional memory address and block word counters which are typically part of control 206 in FIG. 7. The incrementing by one is implemented by incrementing the block word counter causing compound memory 251(2) to be recycled with the updated address (e.g., updated lower order bits) and continuing the operation until the last word of a block is detected (e.g., block word counter equals zero).

In a manner analogous to the energization of a no-match signal on line 288(1) a no-match signal is generated on line 288(2) any time that a match for identity in the AA(2) portion of compound memory 251(2) is not found. The 288(2) signal gates the effective address to the next higher order compound memory which in this case is compound memory 251(3) (not shown). The line 288(2) energizes a gate 289(3) (not shown) which functions for the compound memory 251(3) in the same manner as the gate 289(2) operates for compound memory 251(2). Similarly, any time the associative array portion, AA(3), of compound memory 251(3) does not detect a match for identity, an analogous line 288(3) (not shown) is energized to gate the effective address on bus 204 to the next higher order compound memory. The gating of the effective address to the next higher order compound memory continues in the same manner through each higher order compound memory until gate 289(N) is energized by line 288(N-1) thereby supplying the effective address to the highest order compound memory 251(N). Each of the higher order compound memories can supply the accessed information block, in the case of an access for reading, to the lower order compound memories via the bus 275 and the appropriate compound memory data register DR(-). If a match for identity is not found in any of the lower order compound memories or in the compound memory 251(N), an output signal on the no-match line 288(N) may be employed as an input to control 206, or otherwise, to signify either an error or the absence of the addressed information within any of the compound memories of the nested compound memory hierarchy of FIG. 7. As discussed above with reference to FIG. 4, the no-match line 288(-) at any level alternatively may function by enabling the accessing means 7 of the next higher level or by enabling the data register 233(-) of that next higher level.

Multilevel Memory Hierarchies

The nested configuration of compound memories in FIG. 7 comprises a multilevel memory hierarchy. The term "level" is employed to designate each one of a number of memories which are separately addressed in accordance with some order, when the information processing system attempts to access addressed information. In FIG. 7, CM(1) is the lowest order memory and is defined to be at the first level of addressing within the memory hierarchy since it is the first memory addressed by the system. CM(2) is the next highest order memory and is defined to be at the second level since it is the second memory addressed by the system if no access occurs in CM(1). Similarly, memory CM(N) is the highest order memory shown and is defined to be at the Nth level.

The ultimate measurements employed for evaluating memory systems are the overall memory accessing time and the overall cost of the memory. An additional factor is convenience to users which generally dictates that, although a multi-leveled hierarchy is employed, the appearance to the user simulates that of a single level. Such multilevel systems which appear as single levels have been called virtual systems.

Many variable factors enter into a cost/speed optimization of a memory hierarchy. In general, the highest speed memory system would include only a single level of high speed memory. Unfortunately, high speed memories are more expensive memories so that additional levels of lower cost, slower memories are employed to reduce cost.

For memory hierarchies including multiple levels of memories inhibiting various accessing speeds, there are many design parameters which must be considered to arrive at an efficient structure. The principal design parameters are the number of levels of memory, the storage capacity of each of the lower order memories, the size of the information blocks for transferring information between levels, the inter-level information block transfer rate (which includes memory accessing speeds), and the control algorithm determining when and under what conditions inter-level transfers are made. Prior examination of known systems is useful in investigating these parameters.

Known systems have employed memory hierarchies with at most two levels of internal memory. Internal memory is a term employed in contrast to external storage, examples of the latter being magnetic discs, magnetic tapes, card readers and other peripheral devices which communicate to the internal memory through a channel having independent logical controls.

A two-level system in accordance with the compound memories of the present invention is obtained when the value of N in FIG. 7 is 2 where the first level may be a buffer and the second level a backing store. Such a system is essentially that of FIG. 4. With a two-level system as described, program analysis has established that block sizes for efficient transfers of information between the first and second levels lie in the range of 32 to 128 bytes (where a byte is eight bits) with 64 bytes being a nominal optimum block size. The reason that such an optimum block size exists is because, if the block size is very small, a low probability exists that, after a reference is made into a block, a subsequent reference to memory will lie within the same block. Although this probability increases as the block size increases, it must also be true that as the block size becomes larger, the time required to transfer a block between the buffer and the backing store becomes longer and soon reaches a point where more time is spent in transmission between the first and second levels than is spent at the principal function of using the data in the processor. As indicated, that optimum has occurred nominally at 64 bytes between first and second internal memory levels of known systems.

In other known systems, particularly those designed for use by many users simultaneously, larger blocks of information have been found efficient for transfers between internal memory and external storage of the electro-mechanical type such as magnetic drums or discs. For such internal to external transfer blocks in a range of from 1,024 to 4,096 bytes have proved most efficient. A reference showing a main memory or a conventional memory or store in block from in U.S. Pat. No. 26,624 to Bloom et al.

In the present invention, more than two levels of internal memory are employed to form a multilevel memory hierarchy. When more than two levels are employed it has been discovered that for efficient operation the information block size for transfers between higher order levels of memories should be between the range of from 2 to 8 times the block size of transfers between the next lower order memory levels. For example, for a three-level memory hierarchy (N equals 3 in FIG. 7) the information block size for transfers between the lowest order (inner) memory CM(1) and the next lowest order (intermediate) memory CM(2) is selected as the 64 byte nominal optimum. In accordance with the present invention, the block size for information transfers between the intermediate memory CM(2) and the next highest order (outer) memory CM(3) is selected as 256 bytes, where the multiplier 4 was chosen from the 2 to 8 range, and where 4 was multiplied times the block size, 64, for transfers between the next lowest order memories [CM(1) and CM(2)]. If the block size chosen for the transfers between the second and third levels is too small, the percentage of time spent in transfers between the second and third memory levels becomes too high because of the high rate of turnover of blocks. If on the other hand, the information block size for transfers between the second and third memory levels is too large, there is too much time expended in transmission of each block. It should be further noted that the choice of too small a block between the second and third levels increases the size of the associative array portion of the compound memory relative to the size of the random access array portion thereby resulting in an increased total memory cost.

With the block transfers selected at 64 and 256 bytes, typical capacities for the memories CM(1) and CM(2) are 16K bytes and 64K bytes, respectively with the outer store CM(3) having a 4M byte capacity. Additionally, a simple typical replacement algorithm is to replace the block which has the property of having the longest period since its last access.

For memory hierarchies having more than three levels the block size for transfers between the higher order levels increases. For example, for a four-level memory hierarchy (N equal 4, FIG. 7) efficient block sizes for transfer between the third and fourth memories are in the range of from 2 to 8 times the block size for transfers between the second and third level.

Multi-Level Control Memory Systems

Figure 9:
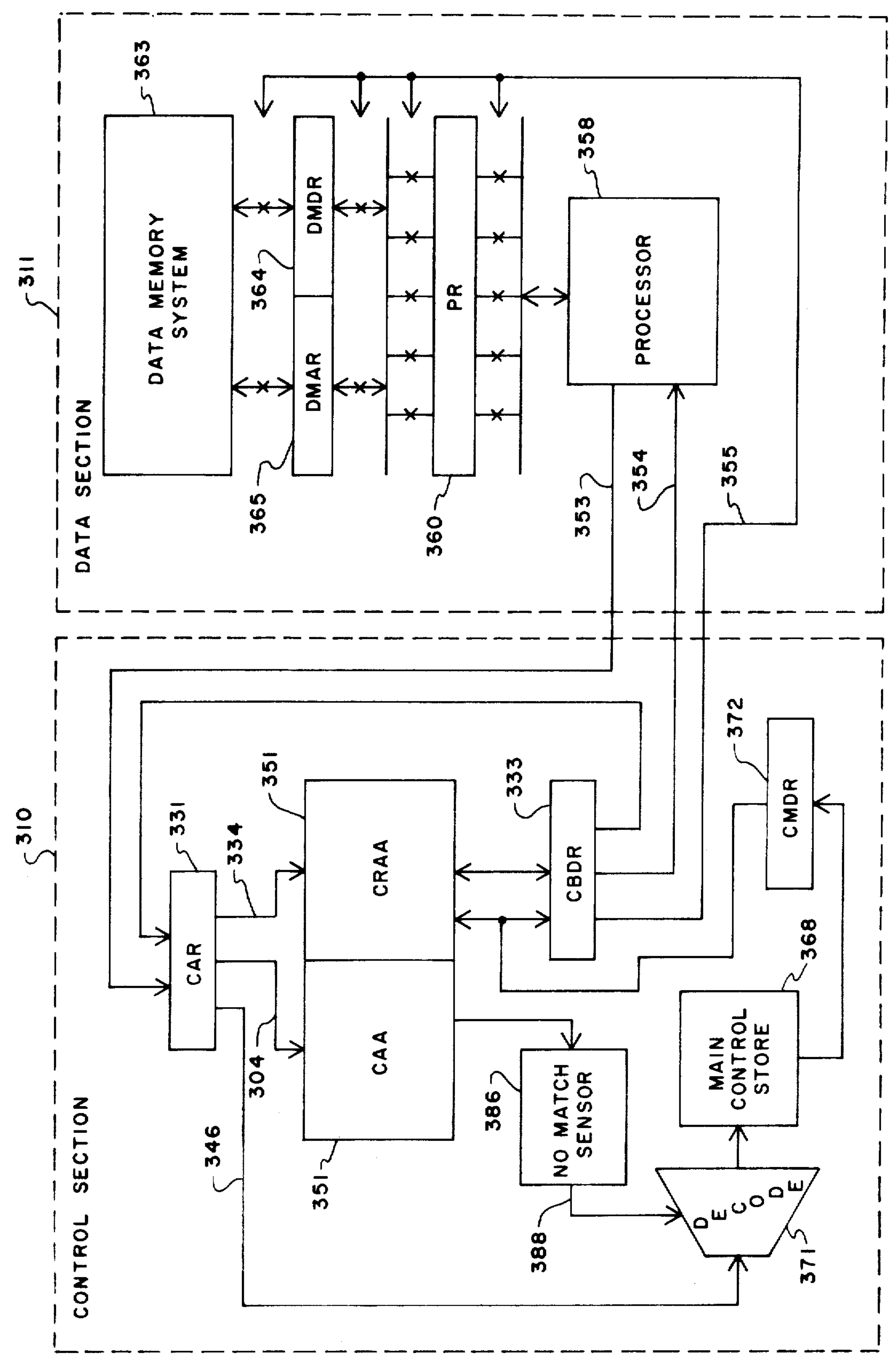
FIG. 9 depicts an information processing system including a data section and a control section having a multilevel control memory hierarchy.

FIG. 9 depicts an information processing system having a multilevel control section 310 in combination with a data section 311. In general, the data section includes one or more data memory address registers 365 and one or more data memory data registers 364 which communicate with a data memory system 363. The memory system 363 may itself include a hierarchy of data memories such as the buffer system of FIG. 4, the transformation system of FIG. 6, or the nested compound memories of FIG. 7. Additionally, the data section 311 of the FIG. 9 system also includes conventional processing apparatus which includes one or more processor registers 360 which communicate with a conventional processor 358 under the gating control of control lines 355 from the control section 310. In general, the data section 311 of the system of FIG. 9 communicates with the control section 310 via the gate control lines 355, for controlling the in and out gating of the processor registers 360, via the functional control lines 354, for controlling the functional operation of the processor 358, and via the data condition lines 353, for supplying data condition information to the control section 310.

In one preferred embodiment of the control section 310 one memory level includes a compound memory 351 which is analogous to the previously described compound memories and which includes a control associative array portion CAA and a control random access array portion CRAA, according to FIGS. 1–3. The control address register (CAR) 331 supplies effective addresses to the CAA portion. Low order bits are supplied to the CRAA portion and a control buffer data register (CBDR) 333 receives information words accessed from blocks in the CRAA.

In a manner analogous to that previously described, a no-match sensor 386 is operative to gate the effective address from the address register 331 to decoder 371 to access an addressed information block from main control store 368. From main control store 368 the information block addressed by decoder 371 is transmitted to control memory data register 372, to control buffer data register 333 and to the control random access array portion 351. The operation is completely analogous to that previously described for the compound memory buffer system. The control associative array CAA is up-dated with the address of the replacement block. One or a group of words may be moved from the main control store to the buffer control memory.

From register 333, the addressed information block is transmitted via gate control bus 355 and function control bus 354 to the data section 311 in order to control the data processing carried out in data processor 358. Similarly, a portion of the information read into the control buffer data register 333 is fed back as a portion of a new effective address supplied to control address register 331 for the next cycle of the control section.

It should be noted that the operation of the control section 310 requires no data section operation in order to access a desired information block, as specified in the control address register 331, and to transmit the information block to control buffer data register 333. The actual physical memory location (e.g., either compound memory 251 or control main store 368) of the addressed information block is transparent to register 331. The accessed information block is derived from the random access array CRAA or from the control main store 368 without any control from the data section 311 and without program interruption.

While the memory hierarchy of the control section has been described with reference to a compound memory 351 and a conventional random access main memory 368, the memory hierarchy of control section 310 may be implemented when both the first memory 351 and the second memory 368 are compound memories. Similarly, neither the first nor the second memories are required to be compound memories. Additionally, all of the memory structures previously described may be implemented in the control section.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an information processing system, a compound memory comprising a random access memory array comprising storage locations for the storage of blocks of words, and an associative memory array comprising storage locations for the storage of a plurality of words with each of said plurality of word storage locations being directly connected to a corresponding storage location defining a block of words in said random access array whereby access to the random access array is achieved using the associate array without the necessity for an intervening addressing element.

2. A memory hierarchy comprising at least two levels of memories, at least one of said two levels of memories including a compound memory comprising a random access memory array comprising storage locations for the storage of blocks of words, and an associative memory array comprising storage locations for the storage of a plurality of words with each of said plurality of word storage locations being directly connected to a corresponding storage location defining a block of words in said random access array whereby access to the random access array is achieved using the associate array without the necessity for an intervening addressing element; and addressing means connected to said two levels of memories for addressing the other level of said two levels of memories when an addressed block of words is not accessed from said one level of memory.

3. An information processing system including a control section having control memories providing control words and a data section having a data memory providing data words connected to said control section and controlled by said control words, said control section comprises, a first control memory comprising storage locations having stored therein a number of blocks of control words; a backup control memory comprising an additional number of storage locations having stored therein blocks of control words; addressing means for directly providing the same addresses to said first control memory and said backup control memory independently of said data section when an addressed block of words is not contained in said first control memory; and means for transferring blocks of control words from said backup control memory to said first control memory.

4. A multilevel memory hierarchy comprising, first, second, and third memories, each of said memories having common addresses for accessing corresponding blocks of words and each said memory operating at a different speed; addressing means connected to each said memory for addressing said blocks of words in parallel; first transfer means for transferring addressed information blocks of words of a first size between said first and second memories; and second transfer means for transferring addressed information blocks of words of a second size between said second and third memories, whereby a block of words desired from said first memory is transferred to said first memory from either the second or third memory when such desired block of words is not contained in said first memory.

5. A method of accessing data words contained in a randomly addressed memory array comprising comparing an address word defining the location of one of said data words against a number of words within an associative memory array so as to detect identity and non-identity; and directly selecting a block of data words in said randomly addressed memory array corresponding to the word within said associative memory array that is identical to at least a portion of said address word, said block of data words being defined by storage locations.

6. A compound memory comprising a random memory access array comprising a plurality of storage locations for the storage of blocks of words and including a plurality of accessing means, one for each block of words;

associative memory array means including a plurality of storage locations for the storage of associative words wherein one associative word is provided for each one of said plurality of blocks of words and including a plurality of match identifier elements wherein there is one match identifier element for each associative word, one of said match identifier elements being energized when the bits of an input address are identical to the bits of its corresponding associative word; and means directly connecting each of said match identifier elements to a corresponding one of said accessing means to permit an energized one of said match identifier elements to directly access the corresponding block of words.

7. An information processing system comprising a main memory having physical memory storage locations providing words of data;

means for generating addresses comprising a number of bits, said addresses defining data contained in said main memory;

means for changing the addresses generated by said address generating means into different addresses representing physical memory storage locations of said main memory, said address changing means comprising a compound memory;

said compound memory comprising a random access memory array comprising storage locations for the storage of blocks of words, and an associative memory array comprising storage locations for the storage of a plurality of words with each of said plurality of word storage locations being directly connected to a corresponding storage location defining a block of words in said random access array whereby access to the random access array is achieved using the associate array without the necessity for an intervening addressing element.

8. A method of accessing information in a data processing system having a plurality of directly connected memories comprising the steps of, generating an address of a block of words stored within a plurality of random access arrays of said data processing system, said block of words being defined by storage locations;

interrogating a first associative array of said system with said address so as to directly access said block of words from a first random access memory array of said system when said first associative array includes a word identical to at least a portion of said address; and interrogating a second associative array of said system with at least a portion of said address when said block of words is not accessed in said first random access memory array so as to directly access said block of words from a second random access memory array of said system.

9. A data processing system comprising a main memory comprising a random access memory array comprising storage locations for the storage of blocks of words, and an associative memory array comprising storage locations for the storage of a plurality of words with each of said plurality of word storage locations being directly connected to a corresponding storage location defining a block of words in said random access array whereby access to the random access array is achieved using the associate array without the necessity for an intervening addressing element;

means for generating addresses for accessing blocks of words in said main memory; and data utilization means for utilizing the data contained in said main memory.

* * * * *